US010711408B1

(12) United States Patent
Divine et al.

(10) Patent No.: US 10,711,408 B1
(45) Date of Patent: Jul. 14, 2020

(54) LANE CONSTRUCTION SAFETY SYSTEM

(71) Applicants: Phillip Wayne Divine, Centralia, MO (US); Brandon Lee Griffith, Madison, MO (US)

(72) Inventors: Phillip Wayne Divine, Centralia, MO (US); Brandon Lee Griffith, Madison, MO (US)

( * ) Notice: Subject to any disclaimer, the term of this patent is extended or adjusted under 35 U.S.C. 154(b) by 0 days.

(21) Appl. No.: 16/241,642

(22) Filed: Jan. 7, 2019

(51) Int. Cl.
*B65G 69/30* (2006.01)
*E01C 9/08* (2006.01)
*E01C 11/22* (2006.01)
*E01C 23/06* (2006.01)
*E01C 23/03* (2006.01)

(52) U.S. Cl.
CPC .............. *E01C 9/086* (2013.01); *B65G 69/30* (2013.01); *E01C 11/222* (2013.01); *E01C 23/03* (2013.01); *E01C 23/06* (2013.01)

(58) Field of Classification Search
CPC ................................ B65G 69/28; B65G 69/30
USPC ....................................... 14/69.5; 404/34, 35
See application file for complete search history.

(56) References Cited

U.S. PATENT DOCUMENTS

| | | | |
|---|---|---|---|
| 1,658,444 A | 2/1928 | Oliver | |
| 2,984,417 A * | 5/1961 | Voorhees | E01C 9/04 238/8 |
| 4,176,789 A | 12/1979 | Rich | |
| 4,660,344 A | 4/1987 | Gaudelli et al. | |
| 4,697,294 A | 10/1987 | Schafer | |
| 5,341,533 A * | 8/1994 | Seitz | B65G 69/287 14/69.5 |
| 5,446,937 A * | 9/1995 | Haskins | B65G 69/287 14/69.5 |
| 5,598,594 A * | 2/1997 | Milliken | B08B 17/00 14/69.5 |
| 5,894,618 A * | 4/1999 | Jacobsen | A63C 19/10 14/69.5 |
| 6,044,511 A * | 4/2000 | Frost | A61G 3/061 14/69.5 |
| 6,067,681 A * | 5/2000 | Zeinstra | A62C 33/06 104/275 |
| 6,675,422 B1 * | 1/2004 | Kuykendall | E01C 11/222 14/69.5 |
| 6,718,588 B1 * | 4/2004 | Frederiksen | B65G 69/30 14/69.5 |
| 7,571,507 B2 * | 8/2009 | Holicki | A61G 5/104 14/69.5 |
| 7,594,778 B2 | 9/2009 | Baranoff | |
| 7,959,372 B2 | 6/2011 | Shanley | |

(Continued)

*Primary Examiner* — Gary S Hartmann
(74) *Attorney, Agent, or Firm* — Armstrong Teasdale LLP

(57) ABSTRACT

A safety system for use along a longitudinal edge of an existing lane of a roadway includes a plurality of pre-formed ramp sections. Each of the ramp sections includes an upright wall configured to be positioned against the longitudinal edge of the existing lane. Each of the ramp sections further includes a top horizontal surface extending laterally outward from the upright wall to an outer edge. The top horizontal surface is positionable adjacent and substantially parallel to a surface of the existing lane when the upright wall is positioned against the longitudinal edge of the existing lane. Each of the ramp sections further includes a ramp surface sloped downward and laterally outward from the outer edge of the top horizontal surface to a terminal edge.

16 Claims, 6 Drawing Sheets

(56) References Cited

U.S. PATENT DOCUMENTS

| | | | |
|---|---|---|---|
| 8,646,140 B2* | 2/2014 | Branyon | B65G 69/30 14/69.5 |
| D722,084 S * | 2/2015 | Lane | D15/28 |
| 2002/0034418 A1 | 3/2002 | Koch | |
| 2005/0123349 A1 | 6/2005 | Koch | |
| 2007/0294844 A1* | 12/2007 | Gunnarson | E01C 11/222 14/69.5 |
| 2008/0292396 A1 | 11/2008 | Shanley | |
| 2009/0317189 A1* | 12/2009 | Baranoff | E01C 9/086 404/135 |
| 2017/0275891 A1* | 9/2017 | Bennett | E01C 13/04 |

* cited by examiner

LANE CONSTRUCTION SAFETY SYSTEM

FIELD

The field of the disclosure relates generally to road construction safety and, more particularly, to a system for mitigating vertical edge drops along a side of an existing lane during roadway construction.

BACKGROUND

During road construction, steep shoulders or edges are often created adjacent to road surfaces, resulting in hazardous driving conditions. For example, when a new lane is to be added beside an existing lane of a roadway, the pavement along the lane boundary of the existing lane is cut vertically to remove the paved shoulder, and the ground adjacent to the existing lane is cleared and compacted, creating a vertical drop from the sheared edge of the existing lane to the ground. During construction periods when traffic is allowed to pass within a threshold distance of the edge drop, safety regulations require an edge treatment to mitigate the edge drop. For example, some jurisdictions require the edge treatment to establish at least a 3:1 grade from the existing lane down to the shoulder.

At least some known edge treatments include dirt or loose rock filled along the sheared edge to create a temporary ramp down from the existing pavement surface to the compacted ground level. Application of such edge treatment along miles of the edge-sheared existing lane at the end of a construction day, and removal of the edge treatment at the start of the next construction day to enable construction to proceed on the new lane, requires long and somewhat unpredictable periods of time. In many cases, a separate construction crew must be contracted to lay down and then remove the edge treatment each time using, for example, dedicated dump trucks and end loaders. Other construction crews and material deliveries are often kept waiting, on the clock, while edge treatment is removed at the start of the construction day. Thus, known edge treatments are a significant source of both direct and indirect delays and expense during highway construction projects.

Moreover, the process of shearing the edge of the existing lane often removes the painted white or yellow lines, spaced reflective markers, and/or "rumble strip" surfacing features that help to advise drivers of the location of the boundary of the existing lane. During construction periods when traffic is allowed to use the existing lane, safety regulations typically require boundary markers (e.g., orange pylons or barrels) arranged along the edge of the existing lane to advise drivers of the location of the boundary and edge hazard. However, edge fill does not provide a stable or level surface for placement of such boundary markers. As a result, the boundary markers typically must be placed at least partially within the existing lane itself, which narrows the space available for traffic in the existing lane and may further impact vehicle safety.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a safety system for use along a longitudinal edge of an existing lane of a roadway is provided. The safety system includes a plurality of pre-formed ramp sections. Each of the ramp sections includes an upright wall configured to be positioned against the longitudinal edge of the existing lane. Each of the ramp sections further includes a top horizontal surface extending laterally outward from the upright wall to an outer edge. The top horizontal surface is positionable adjacent and substantially parallel to a surface of the existing lane when the upright wall is positioned against the longitudinal edge of the existing lane. Each of the ramp sections further includes a ramp surface sloped downward and laterally outward from the outer edge of the top horizontal surface to a terminal edge.

In another aspect, a method for mitigating a longitudinal edge of an existing lane of a roadway is provided. The method includes positioning an upright wall of each of a plurality of pre-formed ramp sections along the longitudinal edge of the existing roadway. The method further includes positioning a top horizontal surface of each of the plurality of ramp sections adjacent and substantially parallel to a surface of the existing lane. The top horizontal surface extends laterally outward from the upright wall to an outer edge. Each of the ramp sections further includes a ramp surface sloped downward and laterally outward from the outer edge of the top horizontal surface to a terminal edge.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

The embodiments described herein include a safety system for use along a longitudinal edge of an existing lane of a roadway. The embodiments include temporary ramp sections installed against the vertical shoulders or edges of an existing lane during road construction. A shape of the ramp sections satisfies edge treatment specifications required for most roadway applications. In some embodiments, the ramp sections are pre-assembled or formed as a monolithic structure, which facilitates rapid deployment from, rapid removal to, and easy storage on the back of any truck. In contrast to loose edge fill, no additional crew members for dump truck deployment and/or scoop removal are needed, and the ramp sections provide a more stable surface (and do not produce flying gravel) when contacted by a vehicle wheel. Moreover, in some embodiments, the ramp sections include pre-installed features to replace lines, spaced reflective markers, and/or rumble strip surfacing lost from the existing lane due to the construction, thereby improving driver safety during construction periods when traffic is allowed to use the existing lane.

Figure 1:
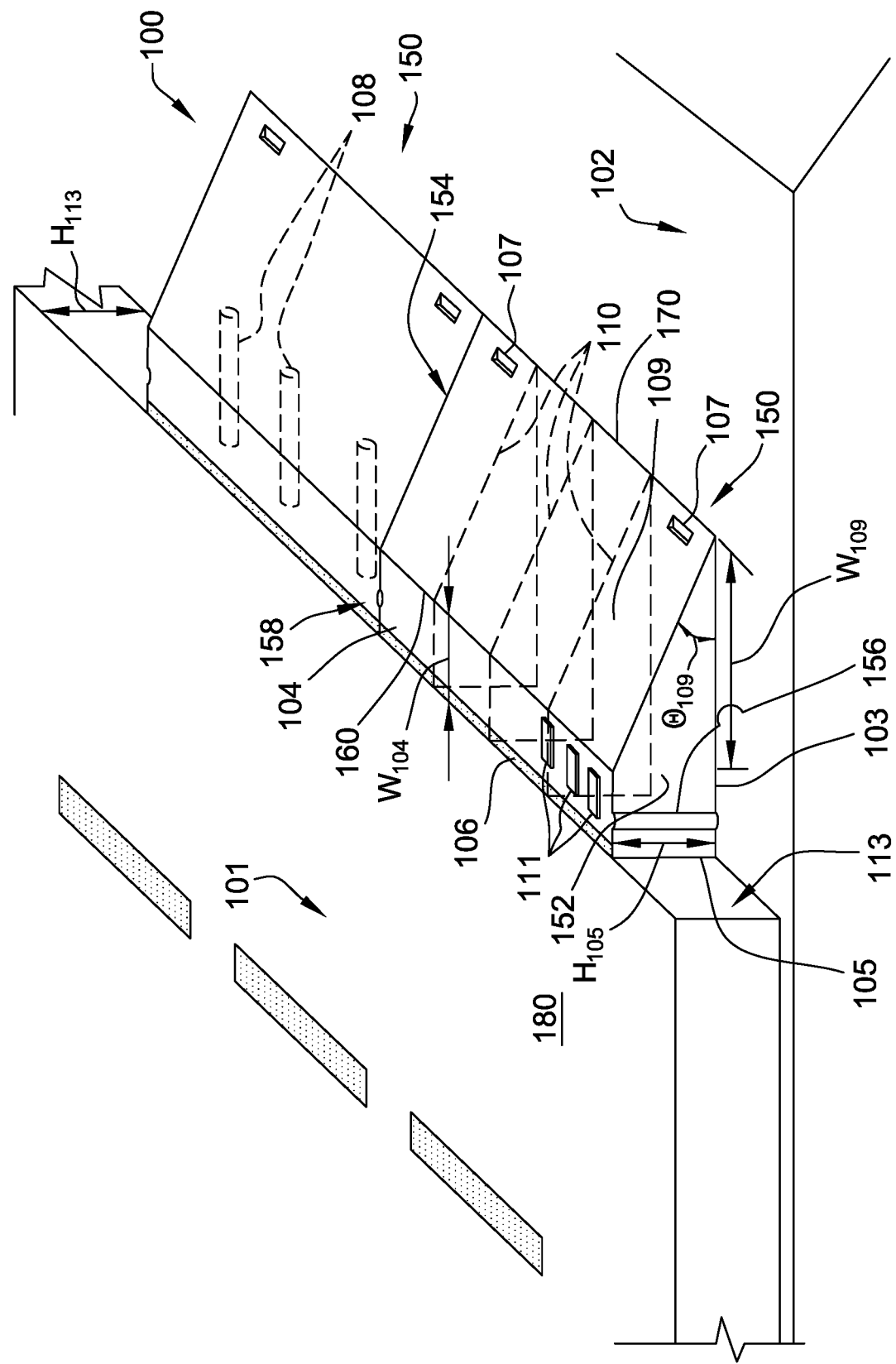
FIG. 1 is a perspective view of an example embodiment of a safety system for use along a longitudinal edge of an existing lane of a roadway.

FIG. 1 is a perspective view of an example embodiment of a safety system 100 for use along a longitudinal edge 113 of an existing lane 101 of a roadway. The term "longitudinal" as used herein means parallel to a direction of vehicle travel along existing lane 101, and the term "lateral" as used herein means transverse to the longitudinal direction. In the illustrated embodiment, longitudinal edge 113 extends generally vertically downward from a surface of the existing lane 180 to a ground surface 102. In the example embodiment, ground surface 102 is a surface on which a new lane (not shown) of pavement or roadway is to be constructed adjacent to existing lane 101. The term "ground surface" is used for convenience and does not require surface 102 to be formed from earthen material. For example, a previously existing paved shoulder (not shown) is sheared off from existing lane 101 along longitudinal edge 113 and removed, exposing ground surface 102 extending laterally outward from longitudinal edge 113, and ground surface 102 is cleared and compacted to serve as a foundation for the new lane. Alternatively, longitudinal edge 113 and ground surface 102 are formed in any fashion.

A height $H_{113}$ of longitudinal edge 113 may present a hazard to vehicles travelling along existing lane 101 (when permitted during construction). For example, height $H_{113}$ of longitudinal edge 113 is typically between 5 inches and 12 inches, with 8 inches being common in some jurisdictions. Alternatively, height $H_{113}$ is any value associated with an existing roadway.

In the example embodiment, safety system 100 includes a plurality of pre-formed ramp sections 150 arranged longitudinally end-to-end in series along longitudinal edge 113 to mitigate the sudden vertical drop from the surface of the existing lane 180 to ground surface 102. More specifically, each ramp section 150 extends longitudinally from a first end 152 to a second end 154, and first end 152 is configured to couple against second end 154 of a longitudinally adjacent ramp section 150. Although only two ramp section 150 are illustrated in FIG. 1, it should be understood that any suitable number of ramp sections 150 extend in series along longitudinal edge 113 of existing lane 101. In some embodiments, first end 152 includes a first interlocking member 156, and second end 154 includes a complementary second interlocking member 158 configured to interlock with first interlocking member 156 of the longitudinally adjacent ramp section 150 to facilitate maintaining a relative longitudinal position of ramp sections 150. For example, first interlocking member 156 is a tongue and second interlocking member 158 is a complementary groove, such that first interlocking member 156 is slidable in a vertical direction into second interlocking member 158 of the adjacent ramp section 150. In the example embodiment, a fit of first interlocking member 156 and second interlocking member 158 is configured to maintain a clearance sufficient to allow corresponding tolerance in the positioning of adjacent ramp sections 152, for example to accommodate positioning along a curved section of existing lane 101 and/or irregularities in a shape of longitudinal edge 113. In alternative embodiments, first interlocking member 156 and second interlocking member 158 have any suitable structure that enables ramp sections 102 to function as described herein. In other alternative embodiments, ramp sections 152 do not include interlocking members 156 and 158.

Each ramp section 150 includes a vertically oriented upright wall 105 configured to be positioned against longitudinal edge 113, and a top horizontal surface 104 that extends laterally outward from upright wall 105 to an outer edge 160. In the example embodiment, upright wall 105 extends continuously in the longitudinal direction from first end 152 to second end 154. In alternative embodiments, upright wall 105 is discontinuous along the longitudinal direction. For example, upright wall 105 is defined by respective laterally inner edges of ends 152 and 154 and/or respective laterally inner edges of ribs 110, as discussed below.

Top horizontal surface 104 is positionable adjacent and substantially parallel to the surface of the existing lane 180 when upright wall 105 is positioned against longitudinal edge 113. For example, in the illustrated embodiment, upright wall 105 has a height $H_{105}$ substantially equal to height $H_{113}$ of longitudinal edge 113, such that top horizontal surface 104 laterally abuts, and is substantially flush with, the surface of the existing lane 180. In alternative embodiments, top horizontal surface 104 and the surface of the existing lane 180 are oriented in another suitable adjacent and substantially parallel relationship. For example, top horizontal surface 104 partially overlays the surface of the existing lane 180 in an adjacent, substantially parallel relationship, as discussed below.

Top horizontal surface 104 has a laterally outward width $W_{104}$ defined between upright wall 105 and outer edge 160 and extends longitudinally between first end 152 and second end 154. In some embodiments, ramp section 150 includes at least one pre-installed lane marker 106 on top horizontal surface 104. Lane marker 106 is configured to replace white or yellow lane boundary lines or spaced reflective markers lost from existing lane 101 due to the construction (e.g. the shearing of longitudinal edge 113), thereby improving driver safety during construction periods when traffic is allowed to use existing lane 101. For example, lane marker 106 includes pre-installed continuous or dashed reflective lines or spaced reflective markers configured to reflect light from a light source, including, for example, automotive headlights. In alternative embodiments, ramp section 150 does not include lane markers 106.

Additionally or alternatively, ramp section 150 includes at least one pre-installed displacement feature 111 on top horizontal surface 104. Displacement features 111 are configured to cause at least one of a tactile vibration and an audible rumbling in an interior of a vehicle in response to a tire of the vehicle contacting the displacement features 111. Displacement features are configured to replace rumble strip surfacing lost from existing lane 101 due to the construction (e.g. the shearing of longitudinal edge 113), thereby improving driver safety during construction periods when traffic is allowed to use existing lane 101. In other words, displacement features 111 alert drivers when they drift from existing lane 101 toward ground surface 102. In response to the tactile vibration and audible rumbling, a driver may be alerted to take corrective action by steering back into existing lane 101.

In the example embodiment, a plurality of displacement features 111 are spaced longitudinally along top horizontal surface 104. Although only three displacement features 111 are illustrated in FIG. 1 for clarity of illustration of other features, it should be understood that displacement features 111 are similarly spaced longitudinally along top horizontal surface 104 of each illustrated ramp section 150. For example, displacement features 111 protrude above, or are depressions in, top horizontal surface 104 and have one of a semi-cylindrical, semi-spherical, rectangular, elliptical, pyramidal, or any other shape that enables displacement features to function as described herein. In alternative embodiments, ramp section 150 does not include displacement features 111.

Additionally or alternatively, laterally outward width $W_{104}$ of top horizontal surface 104 is sufficiently large to accommodate separately provided boundary markers (e.g., orange pylons or barrels, not shown) to advise drivers of the location of the boundary and edge hazard. In contrast to known edge treatments such as loose edge fill, top horizontal surface 104 provides a stable and level surface for placement of such boundary markers outside existing lane 101, which preserves the space available for traffic in existing lane 101 and thus further improves vehicle safety.

Each ramp section 150 further includes a ramp surface 109 sloped downward and laterally outward from outer edge 160 of top horizontal surface 104 to a terminal edge 170. Ramp surface 109 is oriented relative to ground surface 102 at an acute angle of inclination $\theta_{109}$ and extends laterally outward from outer edge 160 over a ramp width $W_{109}$. In the example embodiment, ramp surface 109 is sloped downward relative to top horizontal surface 104 such that ramp width $W_{109}$ is at least three times greater than longitudinal edge height $H_{113}$, which complies with a grade required by edge treatment regulations in many jurisdictions. In alternative embodiments, ramp surface 109 is sloped downward relative to the top horizontal surface 104 at any suitable grade that enables ramp section 150 to function as described herein.

Each ramp section 150 further includes a base 103 configured to transfer to ground surface 102 a force applied, such as by a vehicle, to top horizontal surface 104 and/or ramp surface 109. In the illustrated embodiment, base 103 is defined by a bottom edge of upright wall 105, a bottom edge of opposing longitudinal ends 152 and 154, and a bottom surface of terminal edge 170 of ramp surface 109. In alternative embodiments, base 103 is defined in any suitable fashion that enables ramp section 150 to function as described herein.

In the example embodiment, ramp section 150 also includes at least one rib 110 coupled to an underside of ramp surface 109 between opposing longitudinal ends 152 and 154 and configured to increase a structural stiffness of ramp surface 109. In the example embodiment, the at least one rib 110 includes a plurality of ribs 110, and more specifically three ribs 110 spaced apart longitudinally. In alternative embodiments, the at least one rib 110 includes any suitable number of ribs 110 that enables ramp section 150 to function as described herein. In the example embodiment, ribs 110 extend vertically downward to ground surface 102 such that a bottom edge of each rib 110 further defines base 103. In alternative embodiments, ribs 110 extend vertically downward to any suitable extent that enables ramp section 150 to function as described herein. In some embodiments, ribs 110 extend laterally inward such that a laterally inward edge of each rib 110 further defines upright wall 105. In alternative embodiments, ribs 110 extend laterally inward to any suitable extent that enables ramp section 150 to function as described herein. In other alternative embodiments, ramp section 150 does not include any ribs 110.

In some embodiments, the construction of a new lane over ground surface 102 includes the insertion of horizontal dowels 108 into existing lane 101 prior to, for example, pouring concrete to form the new lane (not shown). Although horizontal dowels 108 are illustrated only underneath the right-hand ramp section 150 in the view of FIG. 1 for clarity of illustration of other features, it should be understood that additional horizontal dowels 108 extend under the left-hand ramp section 150 as well. Prior to pouring of the material for the new lane, horizontal dowels 108 extend laterally outward from existing lane 101 over ground surface 102. It may be necessary to have safety system 100 in place against longitudinal edge 113 after insertion of horizontal dowels 108 into existing lane 101, but prior to pouring the new lane. Thus, in some embodiments, ramp sections 150 are configured to accommodate horizontal dowels 108 extending laterally outward from existing lane 101 and underneath ramp surface 109. For example, ramp surface 109 slopes downward through an elevation at which horizontal dowels 108 extend, and top horizontal surface width $W_{104}$ is sized sufficiently large to displace ramp surface 109 at the dowel elevation laterally outward from an outer end of horizontal dowels 108. For another example, a spacing of the at least one rib 110 from opposing longitudinal ends 152 and 154 is selected to avoid interference with a known spacing of horizontal dowels 108.

In some embodiments, each ramp section 150 including upright wall 105, top horizontal surface 104, ramp surface 109, opposing longitudinal ends 152 and 154, and in some embodiments ribs 110, is pre-assembled or formed as a monolithic structure, facilitating rapid deployment from, rapid removal to, and easy storage on the back of any truck. In alternative embodiments, ramp section 150 is at least partially assembled and/or disassembled during installation and removal, respectively.

In the example embodiment, ramp section 150 includes at least one aperture 107 defined in ramp surface 109 and extending therethrough. Apertures 107 are configured to allow pins, spikes, nails, fasteners, or the like to be inserted therethrough and into ground surface 102 to secure ramp section 150 against movement. Additionally or alternatively, apertures 107 are configured to accommodate insertion of a locking mechanism that attaches to a corresponding one of horizontal dowels 108 (not shown, e.g., a sliding clasp coupleable to horizontal dowel 108 and fastened to a cable having a stop that interferes with aperture 107) to secure ramp section 150 against movement. In the illustrated embodiment, the at least one aperture 107 includes two apertures 107. In alternative embodiments, the at least one aperture 107 includes any number of apertures 107 that enables ramp section 150 to function as described herein. In other alternative embodiments, ramp section 150 does not include any apertures 107.

Figure 2:
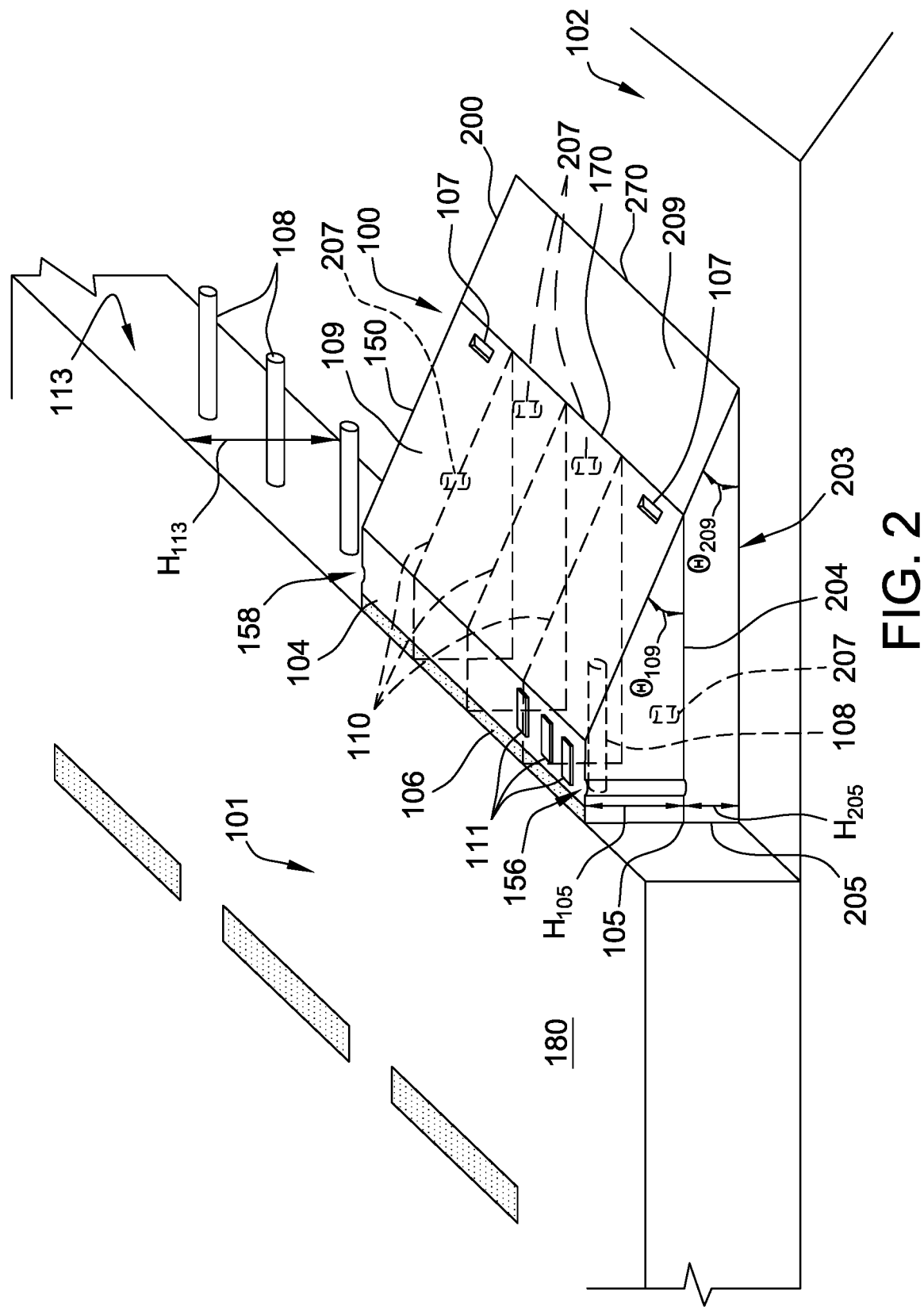
FIG. 2 is a perspective view a ramp section of the lane construction safety system shown in FIG. 1 coupled to an example embodiment of a detachable base extension.

FIG. 2 is a perspective view of ramp section 150 coupled to an example embodiment of a detachable base extension 200. In the example embodiment, each of the plurality of pre-formed ramp sections 150 arranged longitudinally end-to-end in series along longitudinal edge 113 are coupled to a respective one of a plurality of base extensions 200, however, only one ramp section 150 and corresponding detachable base extension 200 are shown in FIG. 2 for ease of description. Detachable base extension 200 is configured to increase a height of top horizontal surface 104 to accommodate a larger edge drop at longitudinal edge 113. In other words, detachable base extension 200 enables ramp sections 150 having, for example, upright wall height $H_{105}$ of 8 inches to also be used against on a roadway construction project for which longitudinal edge height $H_{113}$ is, for example, 12 inches.

More specifically, in the example embodiment, detachable base extension 200 includes a top surface 204 configured to couple to base 103 of ramp section 150 in any suitable fashion to prevent relative movement between ramp section 150 and detachable base extension 200. For example, top surface 204 is configured to receive fasteners (not shown) inserted through apertures 107, or at other locations along base 103. Additionally or alternatively, top surface 204 and base 103 include complementary snap-fit features 207. Top surface 204 has a height $H_{204}$ selected to combine with upright wall height $H_{105}$ to substantially equal longitudinal edge height $H_{113}$, such that when upright wall 105 of ramp section 150 coupled to detachable base extension 200 is positioned against longitudinal edge 113, top horizontal surface 104 is positioned adjacent and substantially parallel to the surface of the existing lane 180. In the example above, top surface 204 has a height $H_{204}$ of 4 inches, which combines with $H_{105}$ of 8 inches to equal 12-inch longitudinal edge height $H_{113}$. Thus, detachable base extensions 200 make ramp sections 150 having a given size adaptable to a variety of dimensions of longitudinal edge 113, avoiding a need to obtain a differently sized set of complete ramp sections 150 for different longitudinal edge heights $H_{113}$.

In the example embodiment, detachable base extension 200 includes a vertically oriented upright wall 205 that extends substantially co-planar to upright wall 105 of ramp section 150 when detachable base extension 200 is coupled to ramp section 150. In alternative embodiments, upright wall 205 is oriented in any suitable fashion or detachable base extension 200 does not include upright wall 205.

In the example embodiment, detachable base extension 200 further includes a ramp surface 209 sloped downward and laterally outward from terminal edge 170 of ramp surface 109 to a terminal edge 270. In the example embodiment, ramp surface 209 is oriented relative to ground surface 102 an acute angle of inclination $\theta_{209}$ substantially equal to angle $\theta_{109}$ of ramp surface 109, such that ramp surface 209 matches the grade of ramp surface 109. In alternative embodiments, ramp surface 209 is oriented in any suitable fashion that enables detachable base extension 200 to function as described herein.

Detachable base extension 200 further includes a bottom surface 203 opposite top surface 204. Bottom surface 203 is configured to rest on ground surface 102.

In some embodiments, detachable base extension 200 further includes at least one rib, similar to ribs 110 described above. In the example embodiment, detachable base extension 200 is pre-assembled or formed as a monolithic structure. In alternative embodiments, detachable base extension 200 is at least partially assembled and/or disassembled during installation and removal, respectively.

Figure 3:
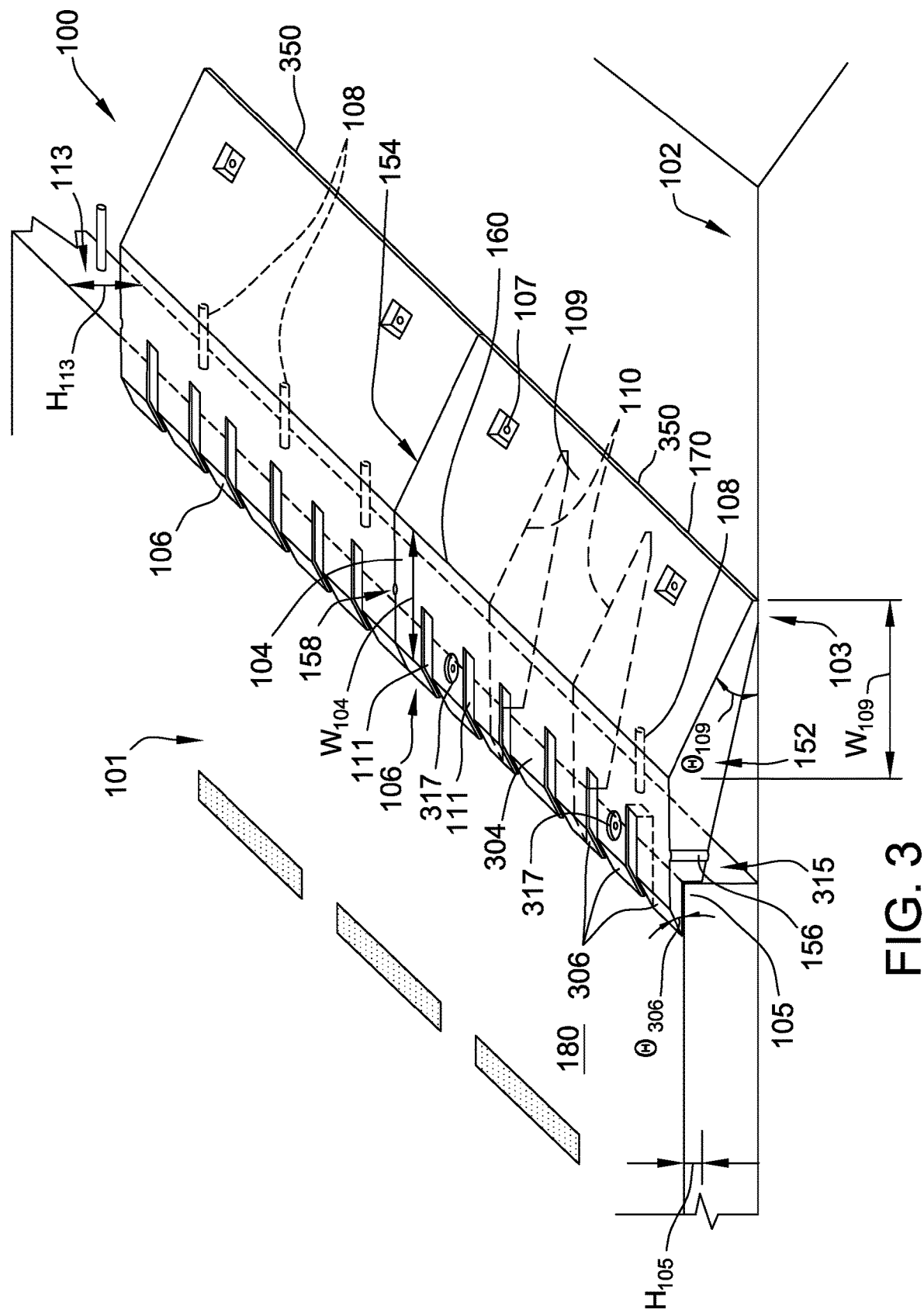
FIG. 3 is a perspective view of another example embodiment of the safety system.
Figure 4A:
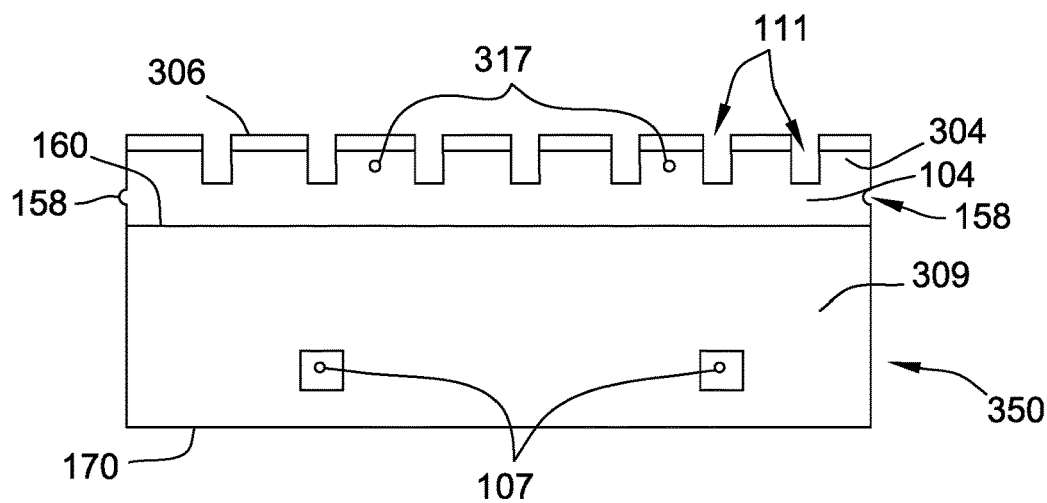
FIG. 4A is a top view of a ramp section of the safety system shown in FIG. 3.
Figure 4B:
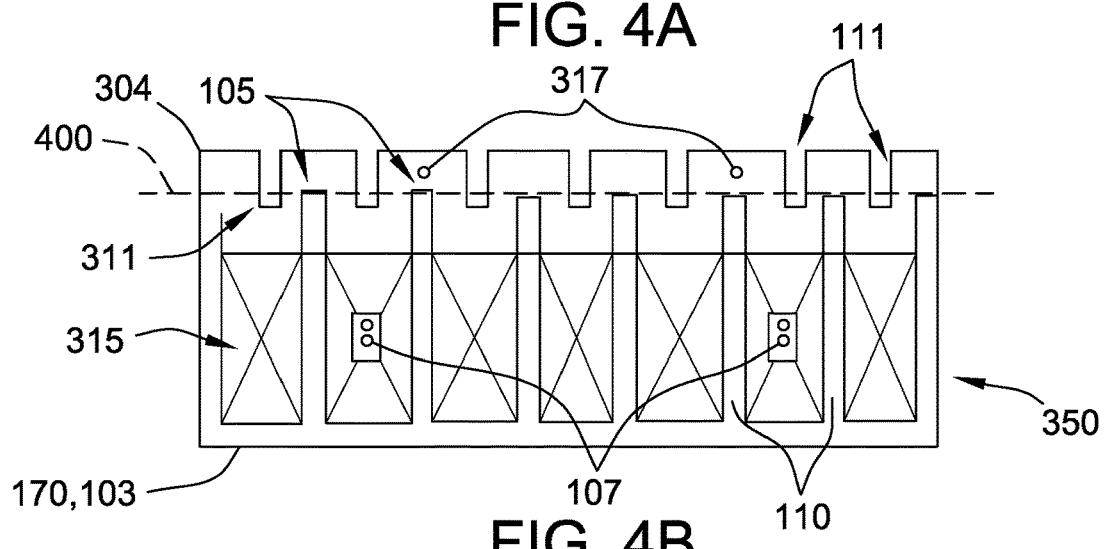
FIG. 4B is a bottom view of the ramp section of the safety system shown in FIG. 3.
Figure 4C:
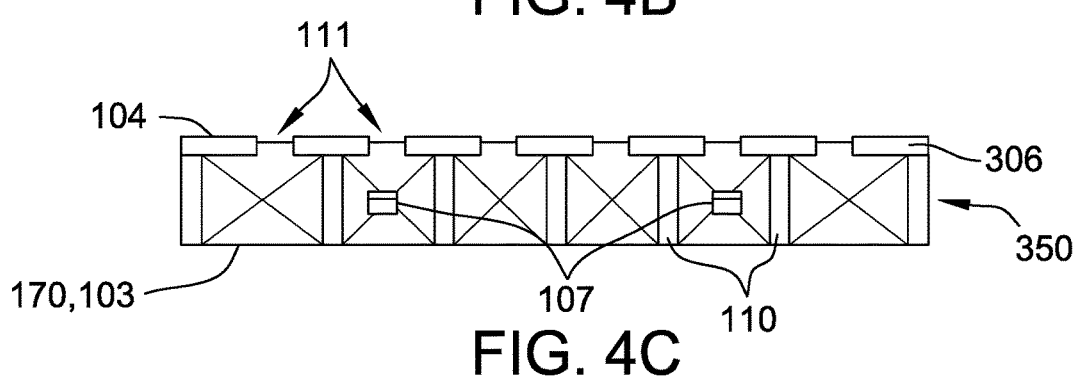
FIG. 4C is a back view of the ramp section of the safety system shown in FIG. 3.
Figure 4D:
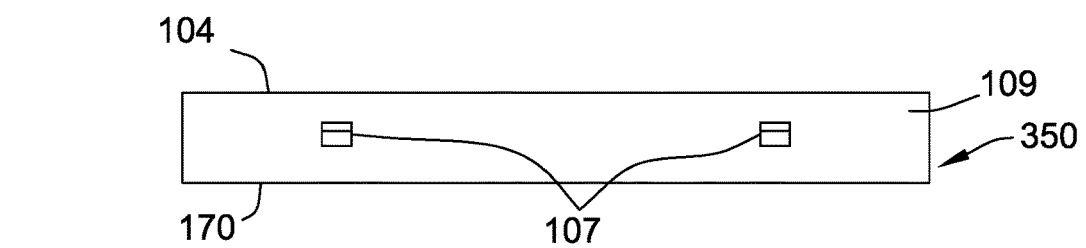
FIG. 4D is a front view of the ramp section of the safety system shown in FIG. 3.
Figure 4E:
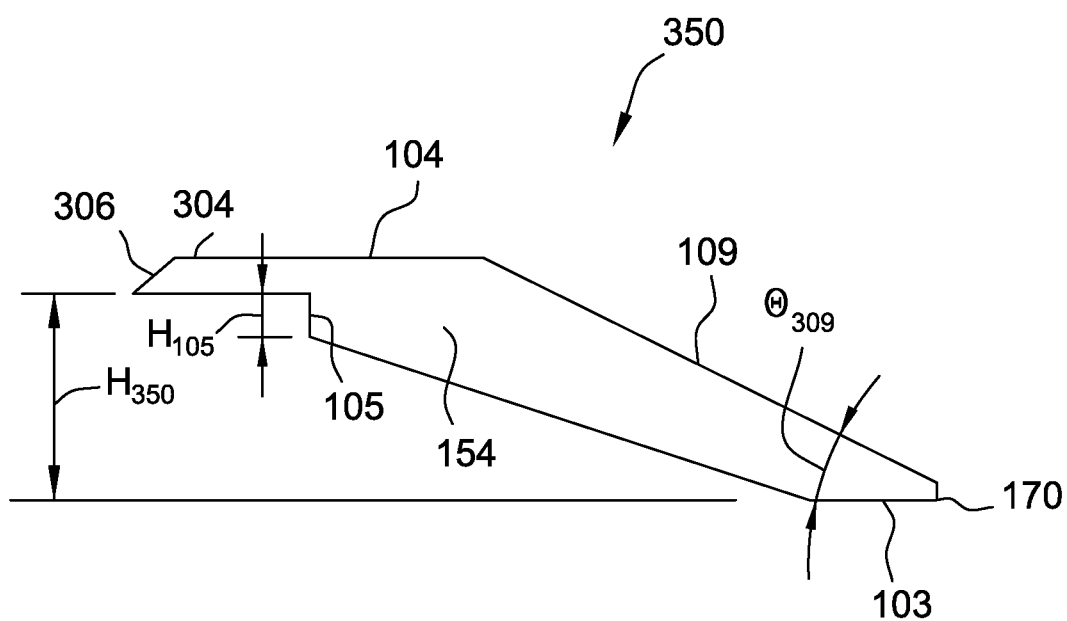
FIG. 4E is a side view of the ramp section of the safety system shown in FIG. 3.

FIG. 3 is a perspective view of another example embodiment of safety system 100. In the illustrated embodiment, safety system 100 includes pre-formed ramp sections 350 arranged longitudinally end-to-end in series along longitudinal edge 113 to mitigate the sudden vertical drop from the surface of the existing lane 180 of existing lane 101 to ground surface 102. FIGS. 4A-E are schematic top, bottom, back, front, and side views, respectively, of ramp section 350.

With reference to FIGS. 3 and 4, ramp sections 350 are similar in many respects to ramp sections 150 described above. For example, each ramp section 350 again extends longitudinally from first end 152 to second end 154, first end 152 is configured to couple against second end 154 of a longitudinally adjacent ramp section 150, and in some embodiments first end 152 includes first interlocking member 156 and second end 154 includes complementary second interlocking member 158, as described above. For another example, each ramp section 350 again includes vertically oriented upright wall 105 configured to be positioned against longitudinal edge 113, and top horizontal surface 104 extending laterally outward from upright wall 105 to outer edge 160 and positionable adjacent and substantially parallel to the surface of the surface of the existing lane 180 when upright wall 105 is positioned against longitudinal edge 113. However, unlike ramp section 150, first side 152, second side 154, and upright wall 105 of ramp section 350 do not extend downward to base 103 (e.g., do not extend down to ground surface 102 or to a detachable base extension). Instead, first side 152, second side 154, and upright wall 105 of ramp section 350 extend down only partially to base 103. In other words, base 103 is defined solely by a bottom surface of terminal edge 170 of ramp surface 109, as shown in FIG. 4E. In alternative embodiments, base 103 is defined in any suitable fashion that enables ramp section 150 to function as described herein. In some embodiments, ramp section 350 therefore has a decreased weight and requires less space when stacked and stored, as compared to ramp section 150.

In the example embodiment, upright wall 105 is discontinuous along the longitudinal direction. For example, upright wall 105 is defined by respective laterally inner edges of ends 152 and 154 and/or respective laterally inner edges of ribs 110, as discussed below. In alternative embodiments, upright wall 105 extends continuously in the longitudinal direction from first end 152 to second end 154.

Moreover, ramp section 350 differs from ramp section 150 in that top horizontal surface 104 does not terminate at longitudinal edge 113 when upright wall 105 is positioned against longitudinal edge 113. Instead, top horizontal surface 104 includes an overhang portion 304 that extends laterally inward beyond upright wall 105. Overhang portion 304 is positionable atop and against the surface of the existing lane 180 when upright wall 105 is positioned against longitudinal edge 113. In some embodiments, overhang portion 304 supported by the surface of the existing lane 180 provides additional structural support for ramp section 350 to at least partially compensate for first side 152, second side 154, and upright wall 105 of ramp section 350 extending down only partially to base 103, while maintaining the positioning of top horizontal surface 104 adjacent and substantially parallel to the surface of the existing lane 180. In the example embodiment, top horizontal surface 104 is again sufficiently wide to accommodate separately provided boundary markers positioned thereon and/or to accommodate horizontal dowels 108 extending laterally outward from existing lane 101 and underneath ramp surface 109, as described above with respect to ramp section 150.

A ramp section height $H_{350}$ (shown in FIG. 4E) is defined between base 103 and an underside of overhang portion 304. Ramp section height $H_{350}$ of ramp section 350 is analogous in some respects to upright wall height $H_{105}$ of ramp section 150.

In the example embodiment, overhang portion 304 includes an inclined contact surface 306 facing laterally inward toward traffic in existing lane 101. Contact surface 306 is configured to cause an opposite steering effect, that is, when a wheel of a vehicle contacts contact surface 306, contact surface 306 tends to guide the wheel back towards a center of existing lane 101, thus aiding a driver in avoiding driving off of existing lane 101. In the illustrated embodiment, the contact surface 306 has an angle of inclination $\theta_{306}$ relative to the surface of the surface of the existing lane 180 of approximately 45°. In other embodiments, angle $\theta_{306}$ is any other suitable angle that enables ramp section 350 to function as described herein.

Each ramp section 350 again includes ramp surface 109 sloped downward and laterally outward from outer edge 160 of top horizontal surface 104 to terminal edge 170, and oriented relative to ground surface 102 at acute angle of inclination $\theta_{109}$. In the example embodiment, ramp surface 109 is again sloped downward relative to top horizontal surface 104 such that ramp width $W_{109}$ is at least three times greater than longitudinal edge height $H_{113}$. In alternative embodiments, ramp surface 109 is sloped downward relative to the top horizontal surface 104 at any suitable grade that enables ramp section 350 to function as described herein.

In the example embodiment, ramp section 350 again includes the at least one aperture 107 defined in ramp surface 109 and extending therethrough, as described above. Moreover, overhang portion 304 of top horizontal surface 104 includes a similar at least one aperture 317 defined therein and extending therethrough and similarly configured to allow pins, spikes, nails, fasteners, or the like to be inserted therethrough and into the surface of the existing lane 180 to secure ramp section 350 against movement. In alternative embodiments, ramp section 350 does not include the at least one aperture 107 and/or the at least one aperture 317.

In the example embodiment, ramp section 350 again includes at least one pre-installed lane marker 106 on top horizontal surface 104, as described above. More specifically, in the example embodiment, lane marker 106 is pre-installed on contact surfaces 306. In alternative embodiments, lane marker 106 is included in any suitable fashion. In other alternative embodiments, ramp section 350 may not include lane markers 106.

In the example embodiment, ramp section 350 again includes the at least one pre-installed displacement feature 111 on top horizontal surface 104 configured to cause at least one of a tactile vibration and an audible rumbling in response to a tire of the vehicle contacting the displacement features 111. More specifically, in the example embodiment, displacement features 111 are longitudinally spaced depressions in overhang portion 304 of top horizontal surface 104. Moreover, in the example embodiment, displacement features 111 extend vertically through top horizontal surface 104 down to the surface of the surface of the existing lane 180. Alternatively, displacement features 111 extend vertically through top horizontal surface 104 to any suitable depression depth. In alternative embodiments, displacement features 111 are any suitable arrangement of protrusions or depressions in top horizontal surface 104 that enables ramp section 350 to function as described herein.

In the example embodiment, ramp section 350 also includes at least one void 311 defined in top horizontal surface 104 and extending therethrough. Voids 311 are configured to facilitate drainage from the surface of the existing lane 180 through overhang portion 304 to ground surface 102. In the example embodiment, voids 311 are defined at the laterally outward ends of displacement features 111 and extend vertically through top horizontal surface 104 into flow communication with an underside 315 of ramp section 350. Dashed line 400 in FIG. 4B indicates a location of longitudinal edge 113 against upright wall 105 during use, with void 311 extending laterally outward beyond line 400 to allow drainage from the surface of the existing lane 180. In alternative embodiments, the at least one void 311 is defined in top horizontal surface 104 in any suitable fashion that enables ramp section 350 to function as described herein. In other alternative embodiments, ramp section 350 does not include any voids 311.

In the example embodiment, ramp section 350 also includes at least one rib 110 coupled to an underside of ramp surface 109, as described above. In the example embodiment, ribs 110 extend vertically downward to the same extent as first side 152, second side 154, and upright wall 105. In alternative embodiments, ribs 110 extend vertically downward to any suitable extent that enables ramp section 350 to function as described herein. In other alternative embodiments, ramp section 350 does not include any ribs 110.

Figure 5:
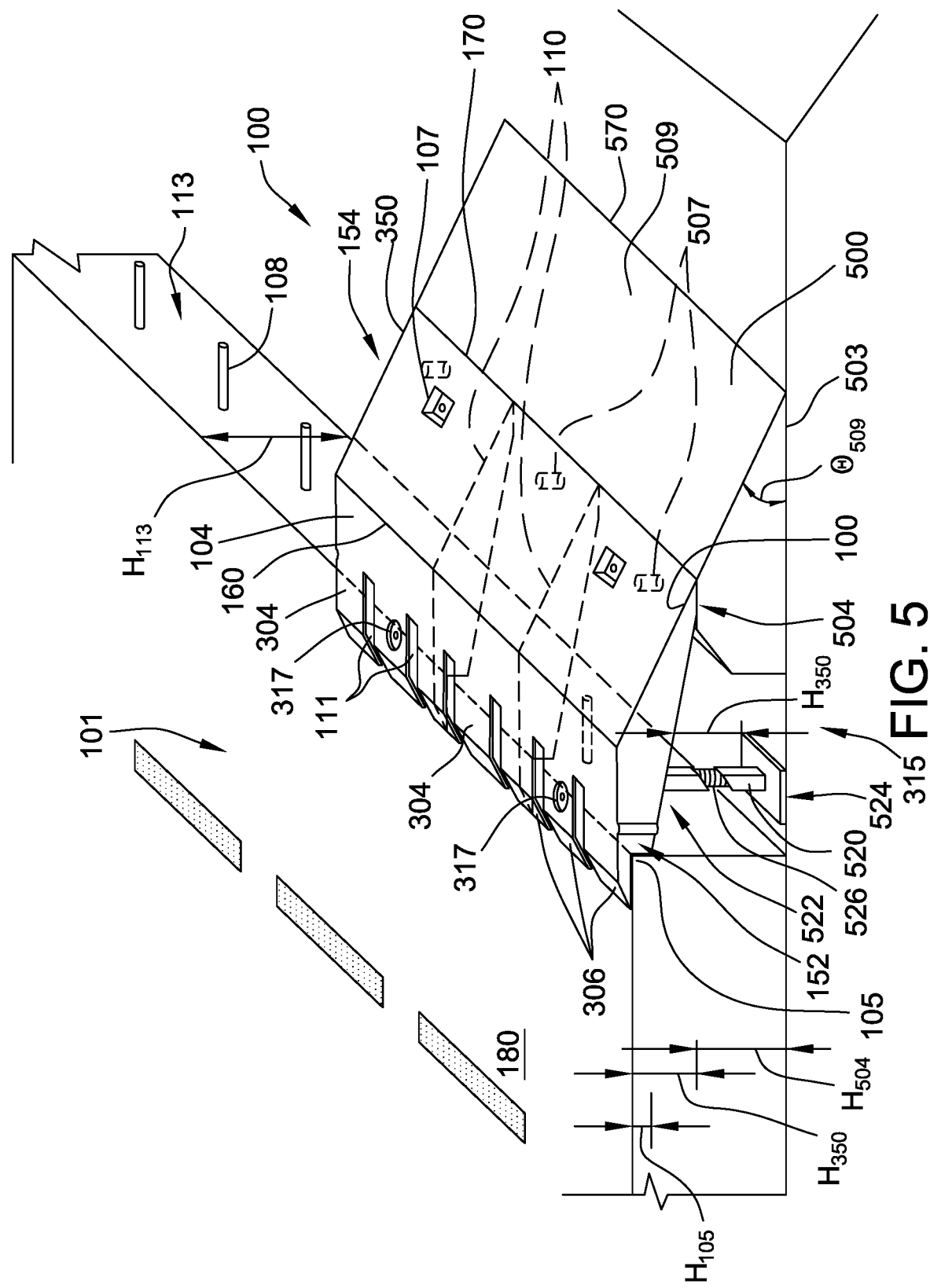
FIG. 5 is a perspective view of the ramp section of the safety system shown in FIG. 3 coupled to another embodiment of the detachable base extension.

FIG. 5 is a perspective view of ramp section 350 coupled to another example embodiment of a detachable base extension, designated detachable base extension 500. In the example embodiment, each of the plurality of pre-formed ramp sections 350 arranged longitudinally end-to-end in series along longitudinal edge 113 are again coupled to a respective one of a plurality of base extensions 500, however, only one ramp section 350 and corresponding detachable base extension 500 are shown in FIG. 5 for ease of description. Detachable base extension 500 is again configured to increase a height of top horizontal surface 104 to accommodate a larger edge drop at longitudinal edge 113.

More specifically, in the example embodiment, detachable base extension 500 includes a top surface 504 configured to couple to base 103 of ramp section 350 in any suitable fashion to prevent relative movement between ramp section 350 and detachable base extension 500. For example, top surface 504 is configured to receive fasteners (not shown) inserted through apertures 107. Additionally or alternatively, top surface 504 and base 103 include complementary snap-fit features 507. Top surface 504 has a height $H_{504}$ selected to combine with ramp section height $H_{350}$ to substantially equal longitudinal edge height $H_{113}$, such that when upright wall 105 of ramp section 350 coupled to detachable base extension 500 is positioned against longitudinal edge 113, top horizontal surface 104 is positioned adjacent and substantially parallel to the surface of the existing lane 180. In the example cited previously, top surface 204 has a height $H_{204}$ of 4 inches, which combines with $H_{350}$ of 8 inches to equal 12-inch longitudinal edge height $H_{113}$. Thus, detachable base extensions 500 again make ramp sections 350 having a given size adaptable to a variety of dimensions of longitudinal edge 113, avoiding a need to obtain a differently sized set of complete ramp sections 350 for different longitudinal edge heights $H_{113}$.

In the example embodiment, detachable base extension 500 again includes a ramp surface 509 sloped downward and laterally outward from terminal edge 170 of ramp surface 109 to a terminal edge 570. In the example embodiment, ramp surface 509 is oriented relative to ground surface 102 an acute angle of inclination $\theta_{509}$ substantially equal to angle $\theta_{109}$ of ramp surface 109, such that ramp surface 509 matches the grade of ramp surface 109. In alternative embodiments, ramp surface 509 is oriented in any suitable fashion that enables detachable base extension 500 to function as described herein.

Detachable base extension 500 further includes a bottom surface 503 opposite top surface 504. Bottom surface 503 is configured to rest on ground surface 102.

In some embodiments, detachable base extension 500 further includes at least one rib, similar to ribs 110 described above. In the example embodiment, detachable base extension 500 is pre-assembled or formed as a monolithic structure. In alternative embodiments, detachable base extension 500 is at least partially assembled and/or disassembled during installation and removal, respectively.

In the example embodiment, safety system 100 further includes at least one support member 520 extending vertically from a first end 522 to a second end 524 and defining a height $H_{520}$ therebetween. First end 522 is coupleable to top horizontal surface 104 and second end 524 is configured to couple against ground surface 302 underneath top horizontal surface 104 when upright wall 105 is positioned against longitudinal edge 113 of existing lane 101. Support member 520 thus provides additional structural support for ramp section 350. In the example embodiment, one support member 520 is positioned between each adjacent pair of ramp sections 350, and support member first end 522 is coupled to top horizontal surface 104 of each adjacent ramp section 350 indirectly through first end 152 and second end 154, respectively. In alternative embodiments, support members 520 are arranged in any suitable fashion and/or coupled to top surface 104 in any suitable fashion. For example, support member first end 522 is coupled to top horizontal surface 104 of ramp section 350 indirectly via one of ribs 110, or directly.

In some embodiments, height $H_{520}$ of support member 520 is adjustable. For example, a particular support member 520 is adjusted to a first support member height $H_{520}$ for use with ramp section 350 without detachable base extension 500, adjusted to a second support member height $H_{520}$ for use with ramp section 350 coupled to detachable base extension 500 having a first value of height $H_{204}$, and adjusted to a third support member height $H_{520}$ for use with ramp section 350 coupled to detachable base extension 500 having a second value of height $H_{204}$.

In the example embodiment, support member height $H_{520}$ is adjustable view a threaded joint 526 located between first and second ends 522 and 524. In alternative embodiments, support member height $H_{520}$ is adjustable in any suitable fashion that enables support member 520 to function as described herein. In other alternative embodiments, safety system 100 does not include support member 520.

Example embodiments of a safety system for use along a longitudinal edge of an existing lane of a roadway, and methods using the safety system, are described above in detail. The safety system and methods are not limited to the specific embodiments described herein, but rather, components of the safety system and steps of the methods may be used independently and separately from other components and steps described herein. For example, the safety systems and methods described herein may be used with a variety of construction projects, including and without limitation, large scale and small scale road or road repaving projects, public and private road or road repaving projects, and any other projects requiring treatment of longitudinal vertical edges between uneven surfaces. The embodiments enhance road construction safety without requiring significant modifications to other components or procedures associated with road construction activities. Thus, the safety systems and methods may be readily incorporated into existing construction project plans, procedures, strategies, or schedules.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A safety system for use along a longitudinal edge of an existing lane of a roadway, said safety system comprising:
   a plurality of pre-formed ramp sections, said each of the plurality of pre-formed ramp sections comprising:
   an upright wall configured to be positioned against the longitudinal edge of the existing lane;
   a top horizontal surface extending laterally outward from the upright wall to an outer edge, wherein said top horizontal surface is positionable adjacent and substantially parallel to a surface of the existing lane when said upright wall is positioned against the longitudinal edge of the existing lane, wherein said top horizontal surface includes an overhang portion that extends laterally inward beyond said upright wall, and wherein said overhang portion is positionable atop and against the surface of the existing lane when said upright wall is positioned against the longitudinal edge of the existing lane;
   a ramp surface sloped downward and laterally outward from said outer edge of said top horizontal surface to a terminal edge; and
   at least one support member extending vertically from a first end to a second end, wherein said first end is coupleable to said top horizontal surface and said second end is configured to couple against a ground surface underneath said top horizontal surface when said upright wall is positioned against the longitudinal edge of the existing lane, and wherein a height of said at least one support member is adjustable to accommodate a height of the longitudinal edge.

2. The safety system of claim 1, further comprising a plurality of displacement features arranged longitudinally along said top horizontal surface, wherein said displacement features are configured to cause at least one of a tactile vibration and an audible rumbling in an interior of a vehicle in response to a tire of said vehicle contacting said displacement features.

3. The safety system of claim 1, wherein said top horizontal surface has a laterally outward width sufficient to enable said each of the plurality of pre-formed ramp sections to accommodate horizontal dowels extending laterally outward from the existing lane and underneath said ramp surface.

4. The safety system of claim 1, wherein said top horizontal surface further comprises a lane marker.

5. The safety system of claim 4, wherein the lane marker comprises at least one of a reflective coating and a plurality of raised markers or reflectors.

6. The safety system of claim 1, wherein said ramp surface is sloped downward relative to said top horizontal surface such that a ramp width is at least three times greater than a height of the longitudinal edge.

7. The safety system of claim 1, wherein said each of the plurality of pre-formed ramp sections further comprises a pair of opposing longitudinal ends and a base defined by a bottom edge of said upright wall, a bottom edge of said pair of opposing longitudinal ends, and a bottom surface of said terminal edge of said ramp surface, said safety system further comprising a plurality of detachable base extensions, wherein each of said detachable base extensions is coupleable to said base of a respective one of the plurality of pre-formed ramp sections such that said top horizontal surface is adjacent and substantially parallel to the surface of the existing lane when said upright wall is positioned against the longitudinal edge of the existing lane.

8. The safety system of claim 1, wherein a plurality of horizontal dowels extend laterally outward from the existing lane, and wherein said each of the plurality of pre-formed ramp sections extends longitudinally from a first end to a second end and further comprises at least one rib coupled to an underside of said ramp surface, said at least one rib spaced from said first and second ends such that interference between said at least one rib and the horizontal dowels extending laterally outward from the existing lane and underneath said ramp surface is avoided.

9. The safety system of claim 1, wherein said top horizontal surface terminates at said upright wall and is positionable substantially flush with the surface of the existing lane when said upright wall is positioned against the longitudinal edge of the existing lane.

10. The safety system of claim 1, wherein said top horizontal surface includes at least one void defined therein, said at least one void extending vertically from said top horizontal surface into flow communication with an opposite side of said each of the plurality of the pre-formed ramp sections and extending laterally outward beyond said upright wall.

11. The safety system of claim 1, wherein said each of the plurality of pre-formed ramp sections further comprises a base defined adjacent to said terminal edge of said ramp surface, said safety system further comprising a plurality of detachable base extensions, wherein each of said detachable base extensions is coupleable to said base of a corresponding one of said each of the plurality of pre-formed ramp sections such that said top horizontal surface is adjacent and substantially parallel to the surface of the existing lane when said upright wall is positioned against the longitudinal edge of the existing lane.

12. The safety system of claim 1, wherein said each of the plurality of pre-formed ramp sections extends longitudinally from a first end to a second end, wherein said first end comprises a first interlocking member and said second end comprises a complementary second interlocking member configured to interlock with said first interlocking member of a longitudinally adjacent one of said plurality of pre-formed ramp sections.

13. The safety system of claim 1, wherein said each of the pre-formed ramp sections is formed as a monolithic structure.

14. A method for mitigating a longitudinal edge of an existing lane of a roadway, wherein a plurality of horizontal dowels each extends laterally outward from the existing lane, said method comprising:

positioning an upright wall of each of a plurality of pre-formed ramp sections along the longitudinal edge;

positioning a top horizontal surface of each of the plurality of pre-formed ramp sections adjacent and substantially parallel to a surface of the existing lane, wherein the top horizontal surface extends laterally outward from the upright wall to an outer edge, and wherein each of the plurality of pre-formed ramp sections further includes a ramp surface sloped downward and laterally outward from the outer edge of the top horizontal surface to a terminal edge; and receiving an entire lateral extent of the plurality of horizontal dowels underneath the top horizontal surface and the ramp surface.

15. The method of claim 14, wherein the top horizontal surface terminates at the upright wall, said method further comprising positioning the top horizontal surface substantially flush with the surface of the existing lane.

16. The method of claim 14, wherein the top horizontal surface includes an overhang portion that extends laterally inward beyond the upright wall, said method further comprising positioning the overhang portion atop and against the surface of the existing lane.

* * * * *